United States Patent [19]

Gerber

[11] Patent Number: 4,563,605
[45] Date of Patent: Jan. 7, 1986

[54] DAMPING DEVICE FOR ROTARY STEPPING MOTOR

[75] Inventor: Heinz J. Gerber, West Hartford, Conn.

[73] Assignee: Gerber Scientific Inc., South Windsor, Conn.

[21] Appl. No.: 629,280

[22] Filed: Jul. 10, 1984

[51] Int. Cl.[4] .................... H02K 37/00; H02K 7/02
[52] U.S. Cl. ................................. 310/74; 74/574; 310/90; 384/462
[58] Field of Search ............... 310/74, 90; 74/572, 74/574; 384/462

[56] References Cited

U.S. PATENT DOCUMENTS 2,454,980 11/1948 Sobell ........................... 318/623
2,932,987 4/1960 Foster ............................ 74/574
3,545,301 12/1970 Richter .......................... 310/74
4,123,675 10/1978 Moskowitz et al. ............ 310/74

FOREIGN PATENT DOCUMENTS 2452639 10/1980 France ........................... 310/74
827078 2/1960 United Kingdom ............. 310/74

Primary Examiner—Peter S. Wong
Assistant Examiner—D. L. Rebsch
Attorney, Agent, or Firm—McCormick, Paulding & Huber

[57] ABSTRACT

A vibration damper for a rotary stepping motor consists of an inertial mass connectible to the shaft of the motor through a viscous coupling comprising a standard rolling element bearing unit filled with a high viscosity material such as a silicone compound.

13 Claims, 4 Drawing Figures

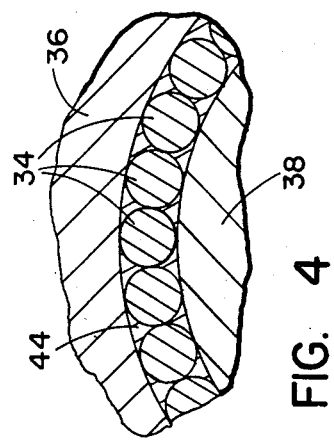
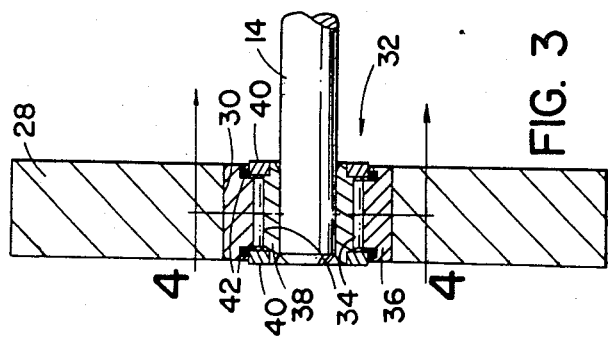

DAMPING DEVICE FOR ROTARY STEPPING MOTOR

BACKGROUND OF THE INVENTION

This invention relates to damping devices of the type used to smooth the output of stepping motors and deals more particularly with such a device of low cost and adapted for use with rotary output stepping motors.

Stepping motors, being essentially digital in nature, are widely used in computer controlled systems for driving parts in situations where accurate control of displacement is needed. As an example, stepping motors are often used to drive the X and Y carriages of an X-Y plotter to accurately position a recording pen or other instrument relative to a recording surface. A disadvantage of stepping motors, however, is that because of their stepwise excitation a certain amount of oscillation of the motor armature occurs at the end of each step. The degree of this oscillation is often acceptable at most excitation frequencies, but when the excitation frequency nears and reaches the resonant frequency of the motor the oscillation may become excessive.

To solve this problem, various different vibration damping devices have been proposed in the past for use with stepping motors. One such device is shown for example in prior U.S. Pat. No. 3,656,014 wherein for a linear stepping motor an inertial mass is connected to the armature of the motor through a viscoelastic member.

The purpose of this invention is to provide a damping device using somewhat the same damping principle as that of prior U.S. Pat. No. 3,656,014, although not necessarily including any elasticity providing member, adapted for use with a rotary stepping motor and capable of being made at low cost using standard readily available components.

Other objects and advantages of the invention will be apparently from the following detailed description of the invention and from the accompanying drawings.

SUMMARY OF THE INVENTION

The invention resides in a damping device for use with a rotary stepping motor made of a simple commercially available rolling element bearing unit, preferably but not necessarily a needle bearing unit, having an inner race for attachment to the shaft of the motor and an outer race carrying an inertial mass. The bearing unit instead of being filled with a lubricant of the type which would normally be used in the bearing for conventional applications of it, is filled with a material, such as a silicone compound, having a relatively high viscosity which remains substantially constant over a wide range of operating temperatures. During operation of the motor the interaction between the filling material and the rolling elements of the bearing and the inner and outer races of the bearing provide a viscous coupling effect which, combined with the inertial effect of the inertial mass, has a desirable damping effect on the motor armature.

BRIEF DESCRIPTION OF THE DRAWINGS

FIG. 3 is a fragmentary sectional view through the damping device of FIG. 1 taken on a diametral plane.

FIG. 4 is an enlarged fragmentary sectional view through the bearing unit of the damping device taken on the line 4—4 of FIG. 3.

DETAILED DESCRIPTION OF THE PREFERRED EMBODIMENTS

Figure 1:
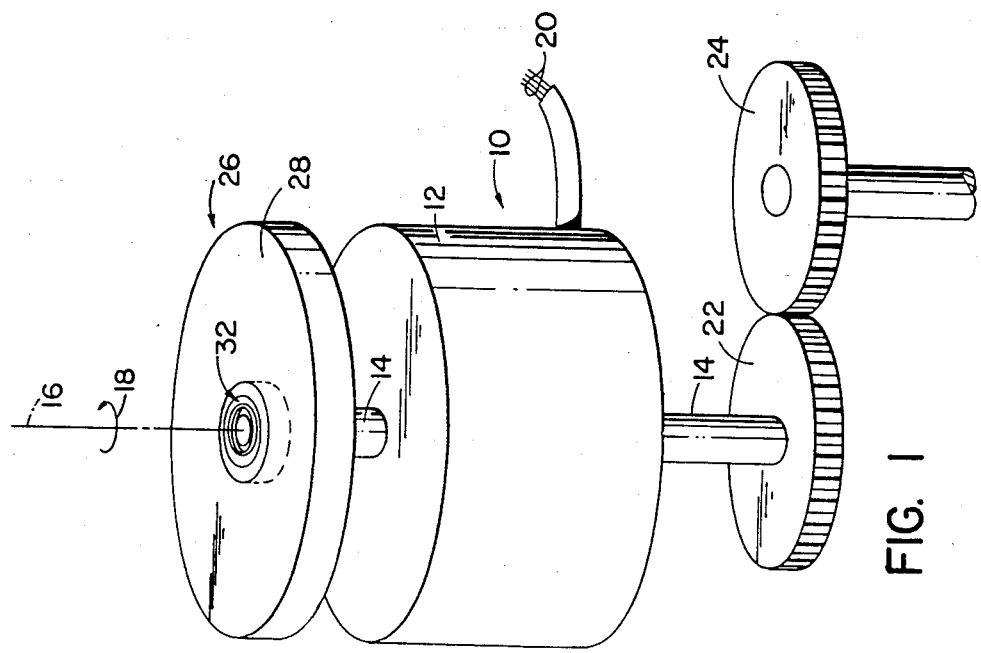
FIG. 1 is a perspective view showing the stepping motor with a damping device embodying the invention.

Turning to the drawings and first considering FIG. 1, a conventional rotary stepping motor, illustrated at 10, has a generally cylindrical case 12 and an output shaft 14 rotatable relative to the case about a central axis 16 as illustrated by the arrow 18. The output shaft is fixed to the armature or rotor of the motor, inside the case 12, which cooperates with a stator also inside the case 12, carrying windings excited by currents supplied in stepwise fashion to them through a set of conductors 20. In the illustrated embodiment the output shaft 14 extends from both ends of the case 12 with the lower end of the shaft having fixed to it an output gear 22 driving an associated load represented by the gear 24 and with the upper end of the shaft 14 carrying a damping device, indicated generally at 26, embodying the present invention. Although not illustrated, it will be understood that the case of the motor is stationary and is supported by and fixed to some supporting structure of the apparatus with which it is used.

The damping device 20 serves to dampen or reduce the magnitude of undesired oscillations of the output shaft 14 inherent in the stepwise excitation of the motor. In principle it consists of an inertial mass connected with the output shaft through a viscous coupling, and in accordance with the invention its construction is such that it can be fabricated from standard commercially available low-cost elements, while nevertheless exhibiting very good vibration damping characteristics.

Figure 2:
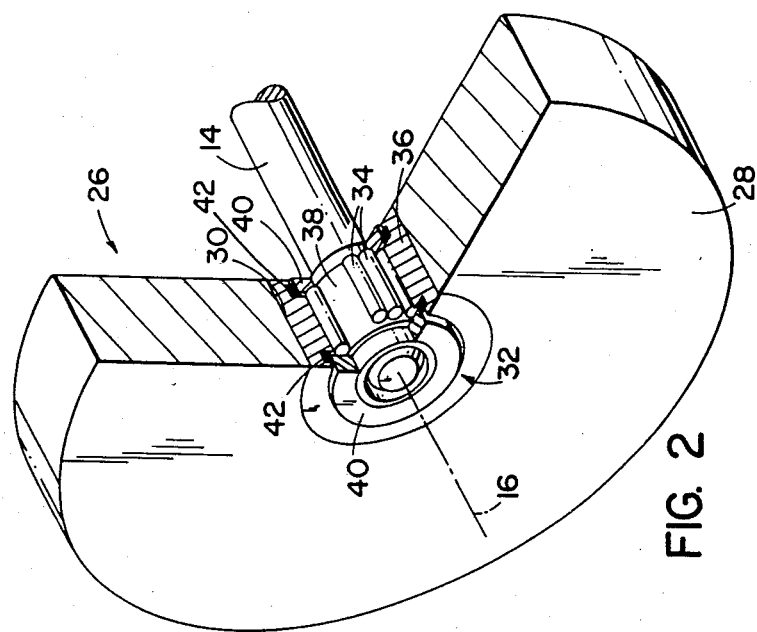
FIG. 2 is a cut-away perspective view of the damping device of FIG. 1.

Referring to FIGS. 2 to 4, the vibration damper 26 consists of an inertial mass 28 in the form of a metal disc having a central opening 30 concentric with the axis 16. Received in the central opening 30 is a rolling element bearing unit filled with a viscous material so that the mechanical elements of the bearing unit, together with its viscous material filling, provide a viscous coupling between the shaft 14 and the inertial mass 28.

The form of the rolling element bearing unit used in making the vibration damper may vary widely, such unit for example being a ball bearing with one or more annular series of balls, or a roller bearing with one or more annular series of rollers. Preferably, and in the illustrated case, however, the bearing unit is a needle bearing unit 32, where the rolling elements are elongated needle rollers 34, 34. By way of specific example, the bearing unit 32 may be a Camrol sealed needle bearing unit model no. CYR-1¼-S.

In addition to the needle rollers 34, 34, the bearing unit 32 includes an outer race 36 press fitted into the opening 30 of the inertial weight or otherwise fixed to such weight, an inner race 38 press fitted or otherwise fixed to the shaft 14, two annular end members 40, 40 each press fitted onto one end of the inner race 38, and two annular resilient seals 42, 42. The two end members 40, 40 together confine the needle rollers 34, 34 laterally in place between the end members 40, 40. The annular resilient seals 42, 42 are received in annular grooves of the outer race 36 and each cooperates with an associated circumferential surface of the associated annular end member 40 to provide a rotary seal, preventing escape of filling material from the interior of the bearing unit.

Instead of the spaces which exist between the inner and outer races 36 and 38 and between the individual needle rollers 34 being filled with a conventional lubricating grease or other lubricant of the type normally used in the bearing unit for conventional applications of it, such spaces are filled, as illustrated best in FIG. 4, with a filling material 44 of relatively high viscosity, such as a viscosity at least as great as that of molasses at room temperature, or a viscosity of at least $1 \times 10^5$ centipoise, and which retains such viscosity over a wide range of operating temperatures such as a temperature range of at least 10° C. to 90° C. Various different high viscosity materials may be used for the material 44, but preferably it is a silicone based material. A presently preferred specific material is General Electric silicone tacky dielectric compound type G661.

A reason that a roller bearing unit filled with viscous material works well as a vibration damper, in accordance with the invention, is that between adjacent rollers the surfaces of the rollers move in opposite directions making the relative motion between the two surfaces twice the speed of each surface and, since the viscosity force is proportional to speed, this is important in enabling large viscosity forces to be generated in little space. Also because of the many rollers, a large surface area is produced in a small space, which also conributes to the production of large viscosity forces. Furthermore, since large viscosity forces can be produced in a small space, the rollers can be located close to the shaft of the motor, thus reducing the inertia of the part of the damper attached to the shaft.

I claim:

1. A damping device for use with a rotary stepping motor, said device comprising an inertial mass having a central axis and a central opening concentric with said axis, an inner member with an opening concentric with said central axis of said inertial mass and adapted for attachment to the output shaft of a stepping motor, said inner member being located within said central opening of said inertial mass and being of smaller external diameter than the internal diameter of said central opening so as to define an annular space between said inertial mass and said inner member, a pair of seals located respectively at opposite ends of said annular space, said pair of seals permitting rotary motion of said inertial mass relative to said inner member about said central axis and closing said opposite ends of said annular space to define a closed annular chamber, and a plurality of rolling elements positioned in said closed annular chamber and providing a rolling bearing support for said inertial mass from said inner member permitting said inertial mass to rotate relative to said inner member about said central axis, and a quantity of viscous material received in said annular chamber and filling the space thereof not occupied by said rolling elements.

2. A damping device as defined in claim 1 further characterized by said rolling elements being needle rollers.

3. A damping device as defined in claim 1 wherein said viscous material is a silicone material.

4. A damping device as defined in claim 1 wherein said viscous material is one having a viscosity of at least $1.0 \times 10^5$ centipoise over a temperature range of 10° C. to 90° C.

5. A damping device as defined in claim 1 wherein said inertial mass includes a metal disc.

6. A damping device for use with a rotary stepping motor, said device comprising an inertial mass having a central axis and an opening concentric with said axis, a rolling element bearing unit received in said opening, said bearing unit having an outer race fixed to said inertial mass, an inner race with an opening concentric with said central axis of said inertial mass and adapted for attachment to the output shaft of a stepping motor, said inner race having an external diameter smaller than the internal diameter of said outer race so as to define an annular space between said races, a pair of seals at the opposite ends of said races closing said annular space to convert it into a closed annular chamber and a plurality of rolling elements positioned in said annular chamber between said inner and outer races, and a quantity of silicone material received in said annular chamber and occupying the spaces which exist between said inner and outer races and between the individual ones of said rolling elements of said rolling element bearing unit.

7. A damping device as defined in claim 6 further characterized by said rolling element bearing unit being a needle bearing unit.

8. The combination comprising a rotary stepping motor having an output shaft and a damping device attached to said output shaft, said damping device comprising an inertial mass having a central axis and an opening concentric with said axis, a rolling element bearing unit received in said opening of said inertial mass, said bearing unit including an outer race fixed to said inertial mass, an inner race with an opening concentric with said central axis of said inertial mass and fixedly receiving said output shaft of said stepping motor, said inner race having an external diameter smaller than the internal diameter of said outer race so as to define an annular space between said races, a pair of seals at the opposite ends of said races closing said annular space to convert it into a closed annular chamber and a plurality of rolling elements positioned in said annular chamber between said inner and outer races, and a quantity of viscous material received in said annular chamber and occupying the spaces which exist between said inner and outer races and between the individual ones of said plurality of rolling bearing elements.

9. The combination defined in claim 8 further characterized by said bearing unit being a needle bearing unit wherein said rolling elements are needle rollers.

10. The combination defined in claim 8 wherein said viscous material is a silicone material.

11. The combination defined in claim 8 wherein said inertial mass is a metal disc.

12. The combination defined in claim 8 wherein said viscous material is one having a viscosity of at least $1.0 \times 10^5$ centipoise over a temperature range of 10° C. to 90° C.

13. A damping device as defined in claim 1 wherein said inertial mass includes a disc and an outer bearing race fixed to said disc and defining said central opening, said inner member being an inner bearing race, and said outer bearing race, said inner bearing race, said pair of seals and said plurality of rolling elements all being parts of a sealed rolling element bearing unit.

* * * * *